(12) United States Patent
Madduri et al.

(10) Patent No.: US 10,793,473 B2
(45) Date of Patent: Oct. 6, 2020

(54) CROSSLINKED POLYSACCHARIDE COMPOSITIONS AND CONCRETE BLENDS CONTAINING THE SAME

(71) Applicant: HPPE, LLC, Columbus, GA (US)

(72) Inventors: Ashoka V. R. Madduri, Columbus, GA (US); Lee A. Manning, Columbus, GA (US); Charles R. Landis, The Woodlands, TX (US); Matthew B. Blackmon, Columbus, GA (US); Christopher Gardner, Columbus, GA (US); Sanket Gandhi, Columbus, GA (US)

(73) Assignee: HPPE, LLC, Columbus, GA (US)

( * ) Notice: Subject to any disclaimer, the term of this patent is extended or adjusted under 35 U.S.C. 154(b) by 23 days.

(21) Appl. No.: 16/337,129

(22) PCT Filed: Nov. 22, 2017

(86) PCT No.: PCT/US2017/063031
§ 371 (c)(1),
(2) Date: Mar. 27, 2019

(87) PCT Pub. No.: WO2018/098291
PCT Pub. Date: May 31, 2018

(65) Prior Publication Data
US 2020/0031715 A1 Jan. 30, 2020

Related U.S. Application Data

(60) Provisional application No. 62/425,852, filed on Nov. 23, 2016.

(51) Int. Cl.
| | |
|---|---|
| *C04B 24/38* | (2006.01) |
| *C04B 24/10* | (2006.01) |
| *C04B 28/02* | (2006.01) |
| *C04B 40/00* | (2006.01) |
| *C08B 15/00* | (2006.01) |
| *C09D 101/02* | (2006.01) |
| *C08B 37/00* | (2006.01) |
| *C09D 105/00* | (2006.01) |
| *C04B 103/40* | (2006.01) |

(52) U.S. Cl.
CPC ............ *C04B 24/38* (2013.01); *C04B 24/10* (2013.01); *C04B 28/02* (2013.01); *C04B 40/0039* (2013.01); *C08B 15/00* (2013.01); *C08B 37/00* (2013.01); *C09D 101/02* (2013.01); *C09D 105/00* (2013.01); *C04B 2103/40* (2013.01)

(58) Field of Classification Search
CPC ......... C04B 24/10; C04B 24/38; C04B 28/02; C04B 40/0039; C04B 2103/40; C08B 15/00; C08B 37/00; C09D 101/02; C09D 105/00
See application file for complete search history.

(56) References Cited

U.S. PATENT DOCUMENTS

| | | | | |
|---|---|---|---|---|
| 7,365,190 | B2 * | 4/2008 | Couture | A61L 15/60 424/69 |
| 8,785,622 | B2 * | 7/2014 | Mabille | C07H 1/00 536/106 |
| 2009/0197829 | A1 | 8/2009 | Mabille et al. | |
| 2009/0253599 | A1 * | 10/2009 | Luczak | C08B 37/00 510/121 |
| 2010/0029929 | A1 * | 2/2010 | Luczak | A61K 8/737 536/114 |
| 2013/0142763 | A1 * | 6/2013 | Carlson | A61L 27/20 424/93.7 |
| 2020/0010711 | A1 * | 1/2020 | Madduri | C09D 105/00 |

FOREIGN PATENT DOCUMENTS

WO 199803184 A1 1/1998

OTHER PUBLICATIONS

International Search Report and Written Opinion received in corresponding PCT Application No. PCT/US2017/063031, search completed Mar. 14, 2018, dated Mar. 14, 2018.
Miller, Markus Michael et al., "Rhamnolipids-next generation surfactants?", Journal of Biotechnology, 2012, vol. 162, No. 4, pp. 366-380.
Nitschke, Marcia et al., "Rhamnolipid surfactants: an update on the general aspects of these remarkable biomolecules," Biotechnology Progress, 2005, vol. 21, No. 6, pp. 1593-1600.
Rosenberg, E. et al., "High-and low-molecular-mass microbial surfactants," Applied Microbiology and Biotechnology, 1999, vol. 52, No. 2, pp. 154-162.

* cited by examiner

*Primary Examiner* — Anthony J Green
(74) *Attorney, Agent, or Firm* — Vorys, Sater, Seymour and Pease LLP

(57) ABSTRACT

Compositions comprising crosslinked polysaccharides, particularly levan and/or dextran, may provide advantageous benefits when admixed with concrete blends. Suitable compositions may comprise a biologically sourced surfactant, and a crosslinked polysaccharide, in which the crosslinked polysaccharide comprises at least one crosslinking group bonded via ether linkages to a first polysaccharide chain and a second polysaccharide chain. Concrete blends may comprise such compositions, a cement and water. Methods for forming and/or using the concrete blends may comprise allowing the concrete blends to form a hardened mass.

21 Claims, 2 Drawing Sheets

CROSSLINKED POLYSACCHARIDE COMPOSITIONS AND CONCRETE BLENDS CONTAINING THE SAME

CROSS-REFERENCE TO RELATED APPLICATIONS

The present application claims the benefit of priority under 35 U.S.C. § 119 from U.S. Provisional Patent Application 62/425,852, filed on Nov. 23, 2016 and incorporated herein by reference in its entirety.

STATEMENT REGARDING FEDERALLY SPONSORED RESEARCH OR DEVELOPMENT

Not applicable.

BACKGROUND

Modern concrete blends represent a material system containing water, cement, aggregates and specialty additives designed to provide both structural integrity and operational versatility for any number of job site conditions. Workability is a leading functional descriptor of the properties of a given concrete blend. Workability of freshly mixed concrete represents the amount of work needed to form a compacted homogeneous placement of the concrete without substantial separation or water loss. Although workability covers a broad range of performance parameters, the primary parameters affected are flexural and compressive strengths, as well as the amount of labor required to address shortcomings of unworkable concrete.

Plasticizers are chemical admixtures used industrially to improve concrete workability without sacrificing strength and set time, or causing cracking, shrinkage or retardation of the concrete set. Since the relationship between compressive strength and workability is usually inversely related, plasticizers are used to maintain strength and workability at the same time.

Common plasticizers used in the concrete industry include polycarboxylate ethers (PCEs). However, these types of compounds are often expensive and add undesirable costs to concrete blends. In addition, polycarboxylate ethers are fully synthetic entities, which can be undesirable when renewable material requirements and regulations must be met. Efforts to convert this category of products into more sustainable alternatives has met with limited success due to cost and performance tradeoffs.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
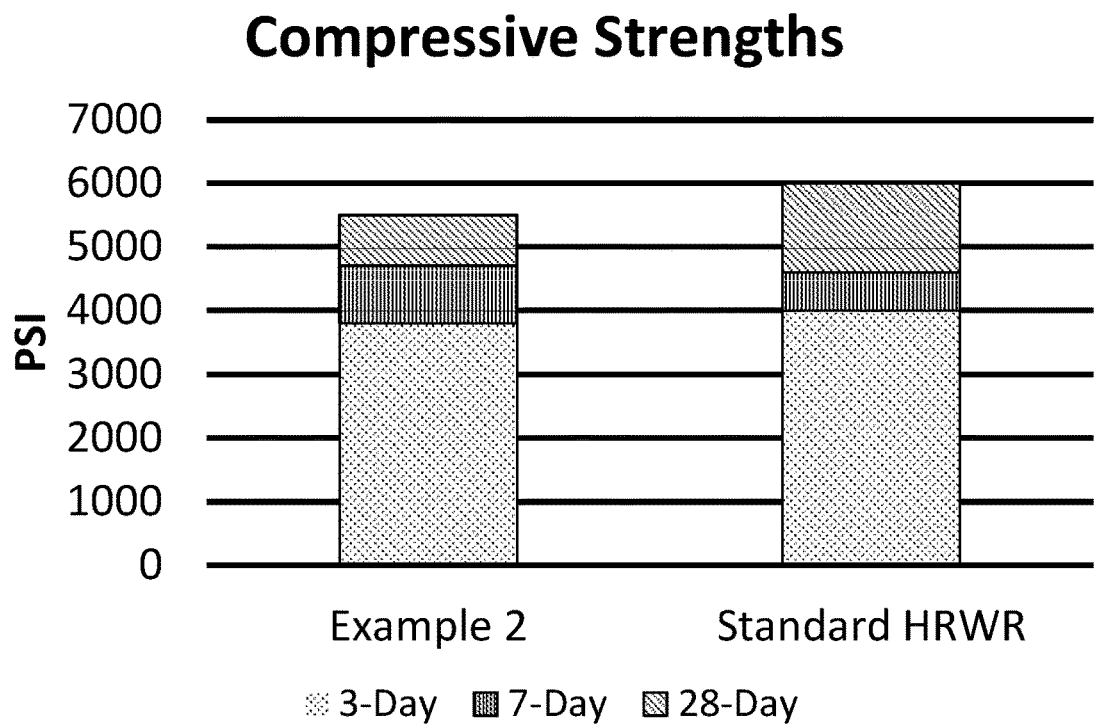
FIG. 1 shows a bar graph comparing the compressive strength of the concrete blend of Example 2 against a concrete blend containing a conventional HRWR.

The present disclosure generally describes crosslinked polysaccharides and, more specifically, compositions comprising crosslinked polysaccharides in combination with a biologically sourced surfactant and concrete blends containing the same.

As discussed above, the workability and other performance parameters of concrete blends can often be problematic. Although plasticizers may be used to improve the workability of concrete blends, cracking, shrinkage or retardation during setting can be problematic in some instances. In addition, common plasticizers are not available from biological sources, and some can be comparatively expensive.

The present disclosure describes various compositions containing crosslinked polysaccharides in combination with a surfactant that may provide surprising and advantageous benefits when incorporated into concrete blends. In particular, the compositions disclosed herein may afford good flexural strength upon setting of the concrete blend, early strength development, limited to no set time retardation, and good workability characteristics, including good flowability and minimal slumping characteristics.

The compositions of the present disclosure may comprise various components that are derived substantially from biological sources. Suitable crosslinked polysaccharides may include those in which a crosslinking group is bonded via a first ether linkage to a first polysaccharide chain and via a second ether linkage to a second polysaccharide chain. Additional details of the crosslinking chemistry are discussed hereinbelow. Likewise, suitable surfactants may be biologically sourced (i.e., a "biosurfactant"), according to various embodiments.

Biologically sourced surfactants may provide several advantages in the context of concrete blending, over and above that provided by their biogenic origin. Many biologically sources surfactants are oil-in-water (OW) surfactant systems that are very hydrophilic and improve mixing and handling features of concrete blends. A particular advantage is that little to no foaming tends to occur during blending. In addition, many biologically sourced surfactants are substantially free of environmentally undesirable chlorine and sulfur entities, such as chloride, sulfates and sulfites. In addition, various biologically sourced surfactants are capable of tolerating the extreme pH, hardness and temperature conditions associated with concrete mixing and setting.

According to various embodiments, compositions of the present disclosure may comprise a biologically sourced surfactant, and a crosslinked polysaccharide, in which the crosslinked polysaccharide comprises at least one crosslinking group that is bonded via a first ether linkage to a first polysaccharide chain and via a second ether linkage to a second polysaccharide chain. Additional details concerning the crosslinking group and techniques for forming crosslinks between the first and second polysaccharide chains is discussed hereinbelow.

In illustrative embodiments, the first and second polysaccharide chains may be crosslinked to one another through a reaction with a bis-epoxide or a halohydrin, such as epichlorohydrin. In illustrative embodiments, the crosslinking group may comprise an alkyl moiety or an alkyl moiety having one or more side chain hydroxyl groups extending between the first and second polysaccharide chains via the first and second ether linkages.

In more specific embodiments, the crosslinking group may comprise a reaction product of epichlorohydrin or a similar $C_3$ halohydrin with the first polysaccharide chain and the second polysaccharide chain. In various embodiments, the reaction product of epichlorohydrin may comprise a $C_3$ alkyl moiety having a side chain hydroxyl group, specifically a hydroxyl group located upon the central carbon atom of the $C_3$ carbon chain. Scheme 1 below shows a generic reaction scheme in which epichlorohydrin is used to affect polysaccharide crosslinking. Although Scheme 1 has shown the crosslinking as occurring between a primary hydroxyl group located upon the first and second polysaccharides, it is to be understood that the secondary hydroxyl groups may be involved in crosslinking in some instances.

Scheme 1

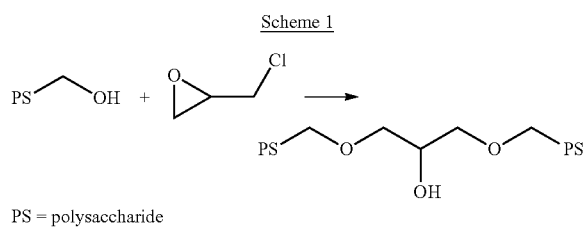

PS = polysaccharide

In various embodiments, crosslinked polysaccharides and other crosslinked polymers of the present disclosure may be produced by reacting a parent polysaccharide with epichlorohydrin in a basic solution at a temperature ranging from about 50° C. to 100° C. for several hours. About 1 to about 90 percent of the available hydroxyl groups in the polysaccharide may undergo a reaction to form crosslinks in this process, in more specific embodiments, about 1 to about 20 percent of the hydroxyl groups may undergo a crosslinking reaction, or between about 20 to about 50 percent of the hydroxyl groups, or between about 50 and about 70 percent of the hydroxyl groups, or between about 70 percent to about 90 percent of the hydroxyl groups. In other various embodiments, an even greater extent of crosslinking may take place, with up to substantially 100 percent of the available hydroxyl groups undergoing a crosslinking reaction. The extent of crosslinking may be used to tailor the resultant properties of the compositions and the cement blends formed therefrom.

Various polysaccharides may be crosslinked using the crosslinking chemistry disclosed herein. Particular polysaccharides are not considered to be especially limited and, in some embodiments, may be selected from the group consisting of levan, dextran, guar gum, scleroglucan, welan, pullulan, xanthan gum, schizophyllan, cellulose, and any combination thereof. In more particular embodiments, the crosslinked polysaccharide may include a levan, a dextran, or any combination thereof. In still more particular embodiments, the crosslinked polysaccharide may comprise a levan. Dextrans and levans crosslinked according to the embodiments of the present disclosure may provide especially advantageous benefits when incorporated in a concrete blend, as discussed herein. Dextrans and levans suitable for use in the embodiments of the present disclosure may be obtained from any source or prepared by any technique including synthetically, fermenting, and the like Scheme 2 below shows an illustrative reaction schematic whereby levan may undergo crosslinking with epichlorohydrin (EPCH), in a manner similar to that outlined generically in Scheme 1 above. As shown, the reaction product of epichlorohydrin with levan produces a $C_3$ alkyl group appended to a first levan chain via a first ether linkage (i.e., at the $C_1$ carbon of the crosslinking group) and to a second levan chain via a second ether linkage (i.e., at the $C_3$ carbon of the crosslinking group). The $C_2$ carbon of the crosslinking group bears a secondary hydroxyl group, which is formed upon opening the epoxide ring of the epichlorohydrin. As drawn, the crosslinking group extends between branching fructose monomer units depending from the main chain. It is to be recognized, however, that this represents but one possible regioisomer of the depicted crosslinking chemistry. In illustrative embodiments, the crosslinking groups may extend between main chain fructose monomer units, between main chain and branching fructose monomer units, or between branching fructose monomer units. A combination of these types of crosslinking motifs may be present in any given crosslinked polysaccharide of the present disclosure. As such, the particular crosslinking motif shown in Scheme 2 should be considered illustrative and non-limiting.

Scheme 2

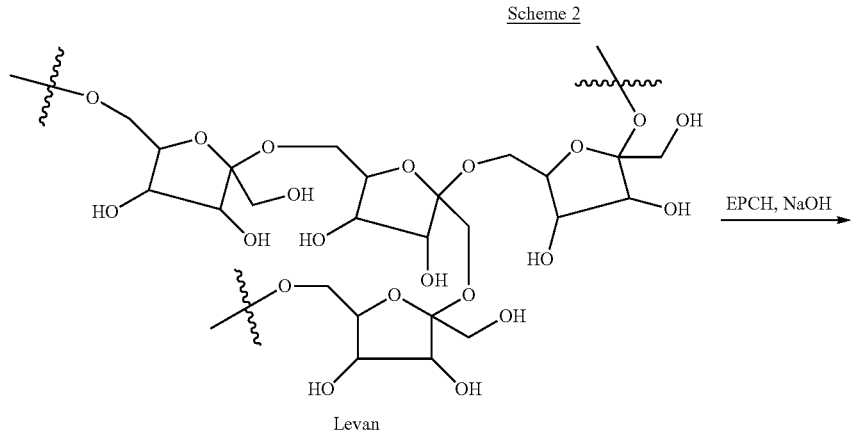

Levan

-continued

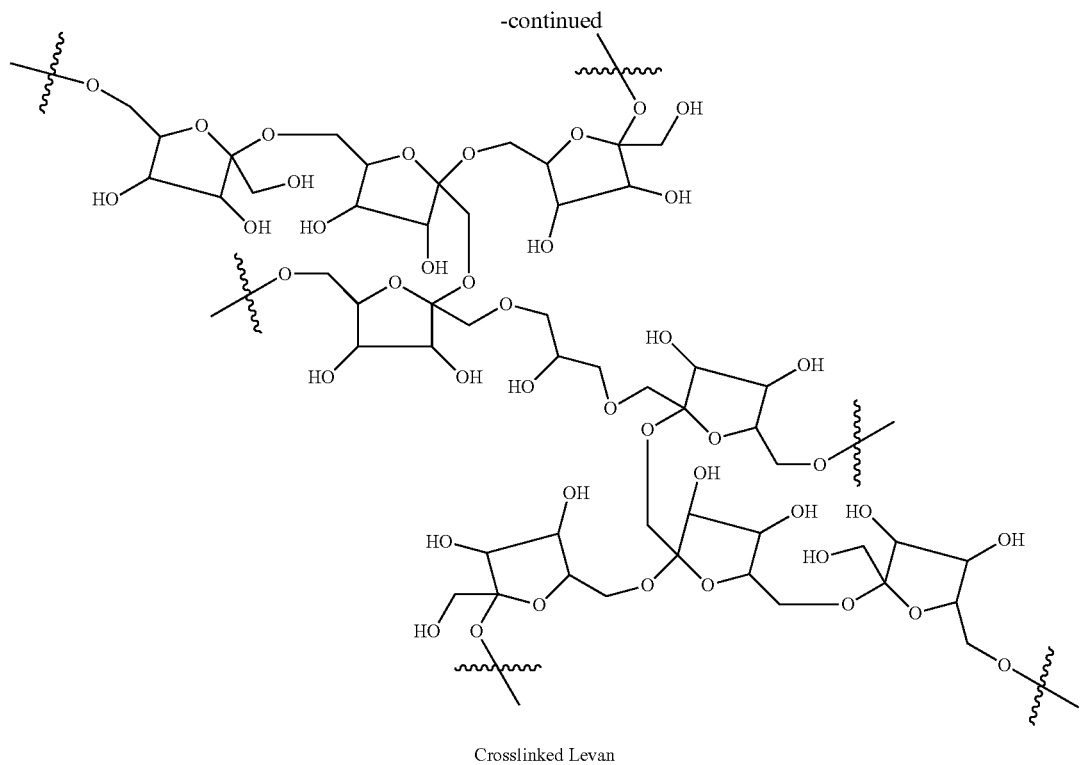

Crosslinked Levan

Other illustrative polymers and copolymers crosslinkable according to the present disclosure may include, for example, acrylic, methacrylic and crotonic acid ester and ether polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crotonate, and the like; polymers of maleic anhydride, esters thereof, and the like; nitrile polymers such as those produced from acrylonitrile; and amide polymers such as those produced from acrylamide, methacrylamide and the like. It is to be appreciated that crosslinking chemistry the same as or different than that used for polysaccharides may be employed to affect crosslinking depending on the types of functional groups present in a given polymer. in general, suitable crosslinking groups may comprise a C1-C8 carbon linker and/or long chain hydroxy aliphatic groups or salts as side chains, which may also contain a C1-C8 carbon linker.

In more specific embodiments, polysaccharides may comprise a plurality of hydroxyl groups, and a portion of these hydroxyl groups may undergo reaction with a crosslinking agent to form a crosslinking group between a first polysaccharide chain and a second polysaccharide chain, via an ether linkage to each chain. In more specific embodiments, the hydroxyl groups that undergo crosslinking may be primary hydroxyl groups upon the first polysaccharide chain and the second polysaccharide chain.

Polysaccharides suitable for use in the embodiments of the present disclosure may encompass a wide range of molecular weights. In illustrative embodiments, the molecular weight of polysaccharides suitable to undergo crosslinking according to the disclosure herein may range between about 1 million and about 50 million Daltons. In more specific embodiments, the polysaccharide molecular weight, particularly for levans, may range between about 1 million and about 5 million Daltons, or between 5 million and about 10 million Daltons, or between 10 million and about 20 million Daltons, or between 20 million and about 30 million Daltons, or between 30 million and about 40 million Daltons, or between 40 million and about 50 million Daltons. In still more specific embodiments, the polysaccharide may comprise a levan having a molecular weight ranging between about 3 million and about 10 million Daltons, which can be particularly desirable for incorporation in concrete blends according to the present disclosure.

Biologically sourced surfactants suitable for use in the compositions and concrete blends of the present disclosure are not believed to be particularly limited. In illustrative embodiments, suitable biologically sourced surfactants may include entities such as, for example, glycolipids, phospholipids, fatty acids and fatty acid esters, fatty acid esters of glycerol, fatty acid esters of sorbitol, fatty acid esters of sucrose, alkyl polyglucosides, lipopeptides and lipoproteins, and the like. The biologically sourced surfactants may be obtained from any suitable biological origin, which may be plant or animal based.

Glycolipids can be particularly desirable in the embodiments of the present disclosure due to the common structural similarity shared between the polysaccharide backbone of the crosslinked polysaccharide and the polysaccharide backbone of the glycolipid. In more specific embodiments, rhamnolipids may be a particularly desirable glycolipid surfactant for use in the compositions and cement blends of the present disclosure. Rhamnolipids are not only EPA-registered as a surfactant, but also possess desirable biocidal properties and good surface tension reduction across a range of pH values. Without being bound by any theory or mechanism, at least some of the features of rhamnolipids are believed to arise due to their large hydrophilic head, which provides good surface coverage at the oil/water interface.

In various embodiments, an amount of biologically sourced surfactant in the compositions of the present disclosure may range between about 1 percent to about 10 percent by weight. In more specific embodiments, an amount of the biologically sourced surfactant may range between about 1 percent to about 2 percent by weight, or between about 1.5 to about 2.5 percent by weight, or between about 2 percent to about 3 percent by weight, or between about 2.5 to about 3.5 percent by weight, or between about 3 percent to about 4 percent by weight, or between about 3.5 to about 4.5 percent by weight, or between about 4 percent to about 5 percent by weight, or between about 4.5 to about 5.5 percent by weight, or between about 5 percent to about 6 percent by weight, or between about 5.5 to about 6.5 percent by weight, or between about 6 percent to about 7 percent by weight, or between about 6.5 to about 7.5 percent by weight, or between about 7 percent to about 8 percent by weight, or between about 7.5 to about 8.5 percent by weight, or between about 8 percent to about 9 percent by weight, or between about 8.5 to about 9.5 percent by weight, or between about 9 percent to about 10 percent by weight. It is to be appreciated, however, that surfactant quantities outside the foregoing ranges, including both quantities below about 1 percent by weight and above about 10 percent by weight are also contemplated in certain embodiments of the present disclosure. For example, in some embodiments, a suitable amount of the biologically sourced surfactant may be about 1 to about 3 gallons of surfactant solution per about 1000 gallons of crosslinked levan solution.

The present disclosure also describes concrete blends comprising the compositions disclosed hereinabove. In various embodiments, the concrete blends may comprise a cement, water and an amount of the compositions disclosed hereinabove. The compositions may be introduced either before, during, or after adding water to form the concrete blends. In illustrative embodiments, a water mixture of a biologically sourced surfactant and a crosslinked polysaccharide may be combined with a cement to form a concrete blend of the present disclosure. Suitable types of cement that may be present in the concrete blends may include, for example, Portland cements. In some or other illustrative embodiments, the concrete blends may comprise an aggregate material such as sand and/or rock.

The compositions disclosed herein may be included in concrete blends in an amount suitable to influence or enhance at least one property selected from the group consisting of flexural strength, early strength development, workability, flowability, and slumping. In illustrative embodiments one or more of the following enhanced properties may be realized: about 5-15% increase in flexural strength compared to base, 90% or more of maximum strength occurring in about 1 day or less, and slump greater than about 7.5 inches.

In illustrative embodiments, compositions of the present disclosure may be included in concrete blends in an amount ranging between about 1 to about 10 ounces per 100 concrete hundred weight (cwt). In more specific embodiments, the compositions may be present in the concrete blends in an amount ranging between about 1 and about 2 ounces per 100 cwt, or between about 2 and about 3 ounces per 100 cwt, or between about 3 and about 4 ounces per 100 cwt, or between about 4 and about 5 ounces per 100 cwt, or between about 5 and about 6 ounces per 100 cwt, or between about 6 and about 7 ounces per 100 cwt, or between about 7 and about 8 ounces per 100 cwt, or between about 8 and about 9 ounces per 100 cwt, or between about 9 and about 10 ounces per 100 cwt, or between about 2 and about 4 ounces per 100 cwt.

In illustrative embodiments, compositions of the present disclosure may accelerate the set rate when incorporated in a concrete blend in the foregoing amounts. In some or other illustrative embodiments, compositions of the present disclosure may provide about 12% or greater water reduction when incorporated in a concrete blend, placing the compositions in the range of conventional high range water reducer (HRWR) and Type F plasticizers.

Embodiments disclosed herein include:

A. Crosslinked polysaccharide compositions. The compositions comprise: a biologically sourced surfactant; and a crosslinked polysaccharide, the crosslinked polysaccharide comprising at least one crosslinking group that is bonded via a first ether linkage to a first polysaccharide chain and via a second ether linkage to a second polysaccharide chain.

B. Concrete blends. The cement blends comprise a cement, water and a composition comprising a biologically sourced surfactant; and a crosslinked polysaccharide, the crosslinked polysaccharide comprising at least one crosslinking group that is bonded via a first ether linkage to a first polysaccharide chain and via a second ether linkage to a second polysaccharide chain.

C. Methods for forming a cement blend. The methods comprise: forming a concrete blend comprising a cement, water, and a composition comprising a biologically sourced surfactant and a crosslinked polysaccharide, the crosslinked polysaccharide comprising at least one crosslinking group that is bonded via a first ether linkage to a first polysaccharide chain and via a second ether linkage to a second polysaccharide chain; and allowing the concrete blend to form a hardened mass.

Embodiments A-C may have one or more of the following additional elements in any combination.

Element 1: where crosslinked polysaccharide comprises a polysaccharide selected from the group consisting of levan, dextran, guar gum, scleroglucan, welan, pullulan, xanthan gum, schizophyllan, cellulose, and any combination thereof.

Element 2: wherein the at least one crosslinking group comprises a reaction product of epichlorohydrin with the first polysaccharide chain and the second polysaccharide chain.

Element 3: wherein the crosslinked polysaccharide comprises a levan, a dextran, or any combination thereof.

Element 4: wherein the crosslinked polysaccharide comprises a levan.

Element 5: wherein the at least one crosslinking group comprises a $C_3$ alkyl moiety having a side chain hydroxyl group.

Element 6: wherein the biologically sourced surfactant comprises a rhamnolipid.

Element 7: wherein the crosslinked polysaccharide comprises a plurality of pendant hydroxyl groups, and between about 1 to about 90 percent of the pendant hydroxyl groups are converted into an ether linkage.

Element 8: wherein an amount of the biologically sourced surfactant ranges between about 1 and about 10 percent by weight of the composition.

Element 9: wherein the composition is present in an amount ranging between about 3 and about 4 ounces per 100 concrete hundred weight (cwt).

Element 10: wherein forming the concrete blend comprises combining a water mixture of the biologically sourced surfactant and the crosslinked polysaccharide with the cement.

By way of non-limiting example, exemplary combinations applicable to A include: 1 and 2; 2 and 3; 2 and 4; 3 and 5; 4 and 5; 1 and 6; 2 and 6; 3 and 6; 4 and 6; 5 and 6; 1 and 7; 2 and 7; 3 and 7; 4 and 7; 5 and 7; 6 and 7; 1 and 8; 2 and 8; 3 and 8; 4 and 8; 5 and 8; 6 and 8; and 7 and 8.

By way of further non-limiting example, exemplary combinations applicable to B and C include: 1 and 2; 2 and 3; 2 and 4; 3 and 5; 4 and 5; 1 and 6; 2 and 6; 3 and 6; 4 and 6; 5 and 6; 1 and 7; 2 and 7; 3 and 7; 4 and 7; 5 and 7; 6 and 7; 1 and 8; 2 and 8; 3 and 8; 4 and 8; 5 and 8; 6 and 8; and 7 and 8, all optionally in further combination with element 9 and/or element 10.

To facilitate a better understanding of the embodiments described herein, the following examples of various representative embodiments are given. In no way should the following examples be read to limit, or to define, the scope of the invention.

EXAMPLES

Example 1

Preparation of Crosslinked Levan. Levan polysaccharide was reacted in water with epichlorohydrin (EPCH) in the presence of base (NaOH) at elevated reaction temperatures to yield crosslinked levan (see Scheme 2). The resulting aqueous phase mixture of the crosslinked levan was used without further purification in forming concrete blends in Example 2

Example 2

Preparation and Testing of Concrete Blends. The aqueous phase crosslinked levan from Example 1 was combined with a biologically sourced surfactant (rhamnolipids) in an amount ranging between 1 and 10 weight percent, which was then combined with a cement to form a concrete blend in a water:cement ratio of 0.575 at set temperature of 78° F. The resulting concrete blends exhibited excellent flexural strength, little to no set retardation, early strength development and good workability, as determined by various ASTM testing methods. The measured properties were comparable or superior to industry standard plasticizers commonly used in the concrete industry.

FIG. 1 shows a bar graph comparing the compressive strength of the concrete blend of Example 2 against a concrete blend containing a conventional HRWR. As shown, the concrete blend of Example 2 had a comparable to superior compressive strength value over the first 7 days of setting and only a marginally lower compressive strength following a 28-day set.

Figure 2:
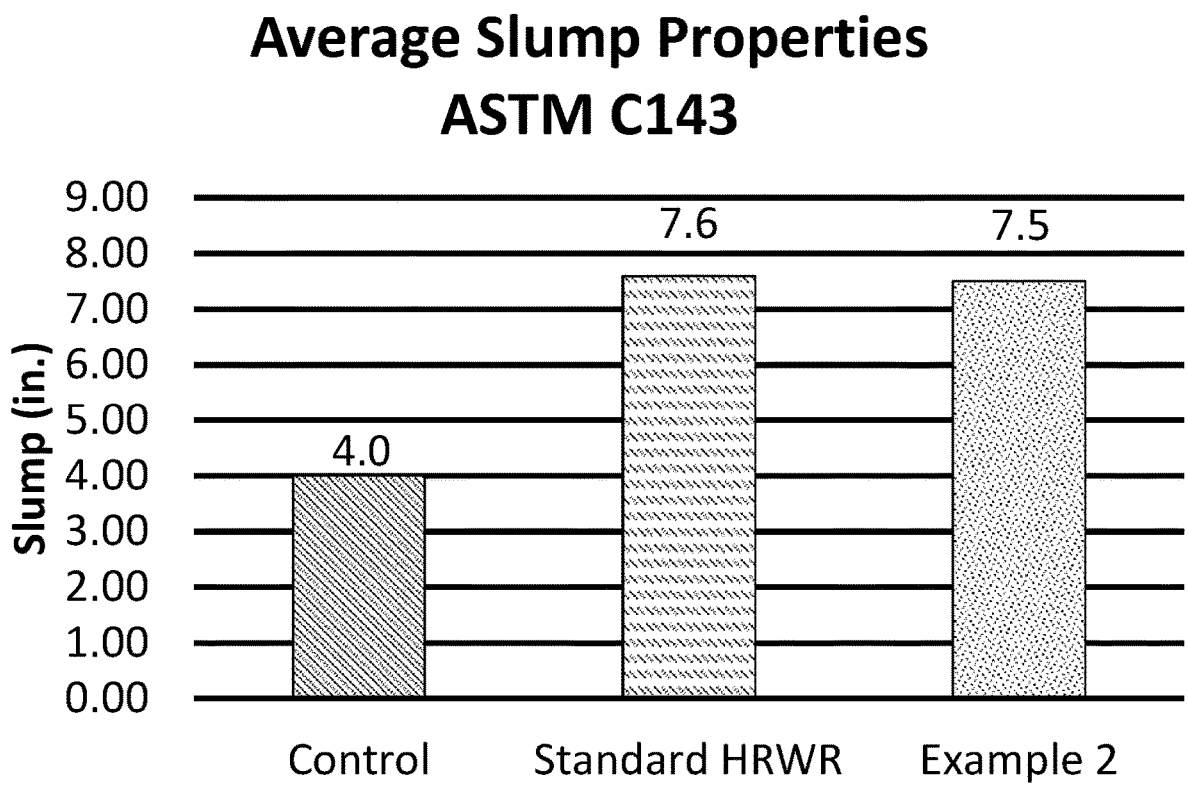
FIG. 2 shows a bar graph comparing the average slump properties determined by ASTM C143 for the concrete blend of Example 2 and a concrete blend containing a conventional HRWR, both in comparison to a control lacking either plasticizer.

FIG. 2 shows a bar graph comparing the average slump properties determined by ASTM C143 for the concrete blend of Example 2 and a concrete blend containing a conventional HRWR, both in comparison to a control lacking either plasticizer. As shown, the concrete blend of Example 2 was again comparable to that containing a conventional HRWR. The higher slump value for the concrete blend of Example 2 compared to the control illustrates the higher workability of the former.

Figure 3:
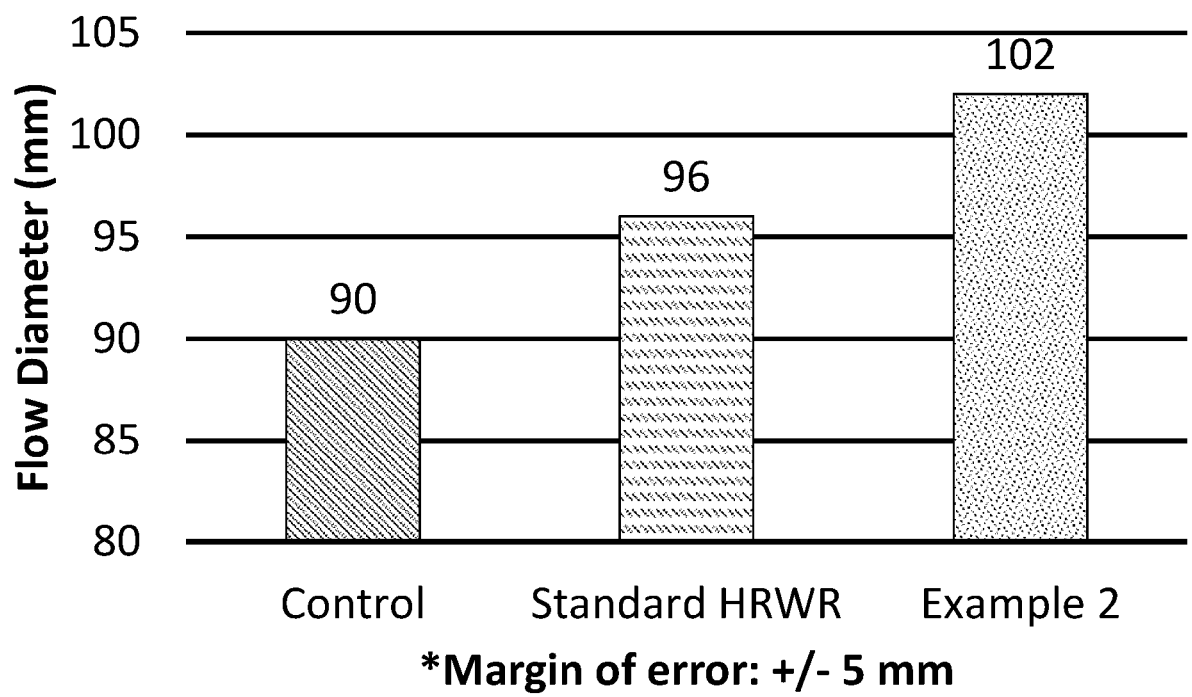
FIG. 3 shows a bar graph comparing the average flowability properties determined by ASTM C109 for the concrete blend of Example 2 and a concrete blend containing a conventional HRWR, both in comparison to a control lacking either plasticizer.

FIG. 3 shows a bar graph comparing the average flowability properties determined by ASTM C109 for the concrete blend of Example 2 and a concrete blend containing a conventional HRWR, both in comparison to a control lacking either plasticizer. As shown, the concrete blend of Example 2 had a superior flow diameter to both the control and the conventional HRWR.

Table 1 provides a summary comparison of the concrete blend of Example 2 against a control and a concrete blend containing a conventional HRWR.

| Sample | Slump (in.) | Air (%) | Initial Set Time (hr) | Final Set Time (Hr) |
| --- | --- | --- | --- | --- |
| Control | 4.0 | 1.4 | 3:18 | 4:32 |
| Conv. HRWR | 7.6 | 1.4 | 3:34 | 4:58 |
| Example 2 | 7.5 | 2.1 | 3:13 | 4:23 |

As shown, the conventional HRWR produced a retarded set compared to both the control and the concrete blend of Example 2. The concrete blend of Example 2, in contrast, was slightly accelerated in comparison to the control.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A composition comprising:
    a biologically sourced surfactant; and
    a crosslinked polysaccharide, the crosslinked polysaccharide comprising at least one crosslinking group that is bonded via a first ether linkage to a first polysaccharide chain and via a second ether linkage to a second polysaccharide chain.

2. The composition of claim 1, where crosslinked polysaccharide comprises a polysaccharide selected from the group consisting of levan, dextran, guar gum, scleroglucan, welan, pullulan, xanthan gum, schizophyllan, cellulose, and any combination thereof.

3. The composition of claim 1, wherein the at least one crosslinking group comprises a reaction product of epichlorohydrin with the first polysaccharide chain and the second polysaccharide chain.

4. The composition of claim 3, wherein the crosslinked polysaccharide comprises a levan, a dextran, or any combination thereof.

5. The composition of claim 3, wherein the crosslinked polysaccharide comprises a levan.

6. The composition of claim 1, wherein the at least one crosslinking group comprises a $C_3$ alkyl moiety having a side chain hydroxyl group.

7. The composition of claim 1, wherein the biologically sourced surfactant comprises a rhamnolipid.

8. The composition of claim 1, wherein the crosslinked polysaccharide comprises a plurality of pendant hydroxyl groups, and between about 1 to about 90 percent of the pendant hydroxyl groups are converted into an ether linkage.

9. The composition of claim 1, wherein an amount of the biologically sourced surfactant ranges between about 1 and about 10 percent by weight of the composition.

10. A concrete blend comprising a cement, water and the composition of claim 1.

11. The concrete blend of claim 10, wherein the at least one crosslinking group comprises a reaction product of epichlorohydrin with the first polysaccharide chain and the second polysaccharide chain.

12. The concrete blend of claim 11, wherein the crosslinked polysaccharide comprises a levan, a dextran, or any combination thereof.

13. The concrete blend of claim 11, wherein the crosslinked polysaccharide comprises a levan.

14. The concrete blend of claim 10, wherein the biologically sourced surfactant comprises a rhamnolipid.

15. The concrete blend of claim 10, wherein the composition is present in an amount ranging between about 3 and about 4 ounces per 100 concrete hundred weight (cwt).

16. A method comprising:
    forming a concrete blend comprising a cement, water, and a composition comprising a biologically sourced surfactant and a crosslinked polysaccharide, the crosslinked polysaccharide comprising at least one crosslinking group that is bonded via a first ether linkage to a first polysaccharide chain and via a second ether linkage to a second polysaccharide chain; and
    allowing the concrete blend to form a hardened mass.

17. The method of claim 16, wherein the at least one crosslinking group comprises a reaction product of epichlorohydrin with the first polysaccharide chain and the second polysaccharide chain.

18. The method of claim 17, wherein the crosslinked polysaccharide comprises a levan, a dextran, or any combination thereof.

19. The method of claim 17, wherein the crosslinked polysaccharide comprises a levan.

20. The method of claim 16, wherein forming the concrete blend comprises combining a water mixture of the biologically sourced surfactant and the crosslinked polysaccharide with the cement.

21. The method of claim 16, wherein the biologically sourced surfactant comprises a rhamnolipid.

* * * * *